United States Patent Office 3,021,549
Patented Feb. 20, 1962

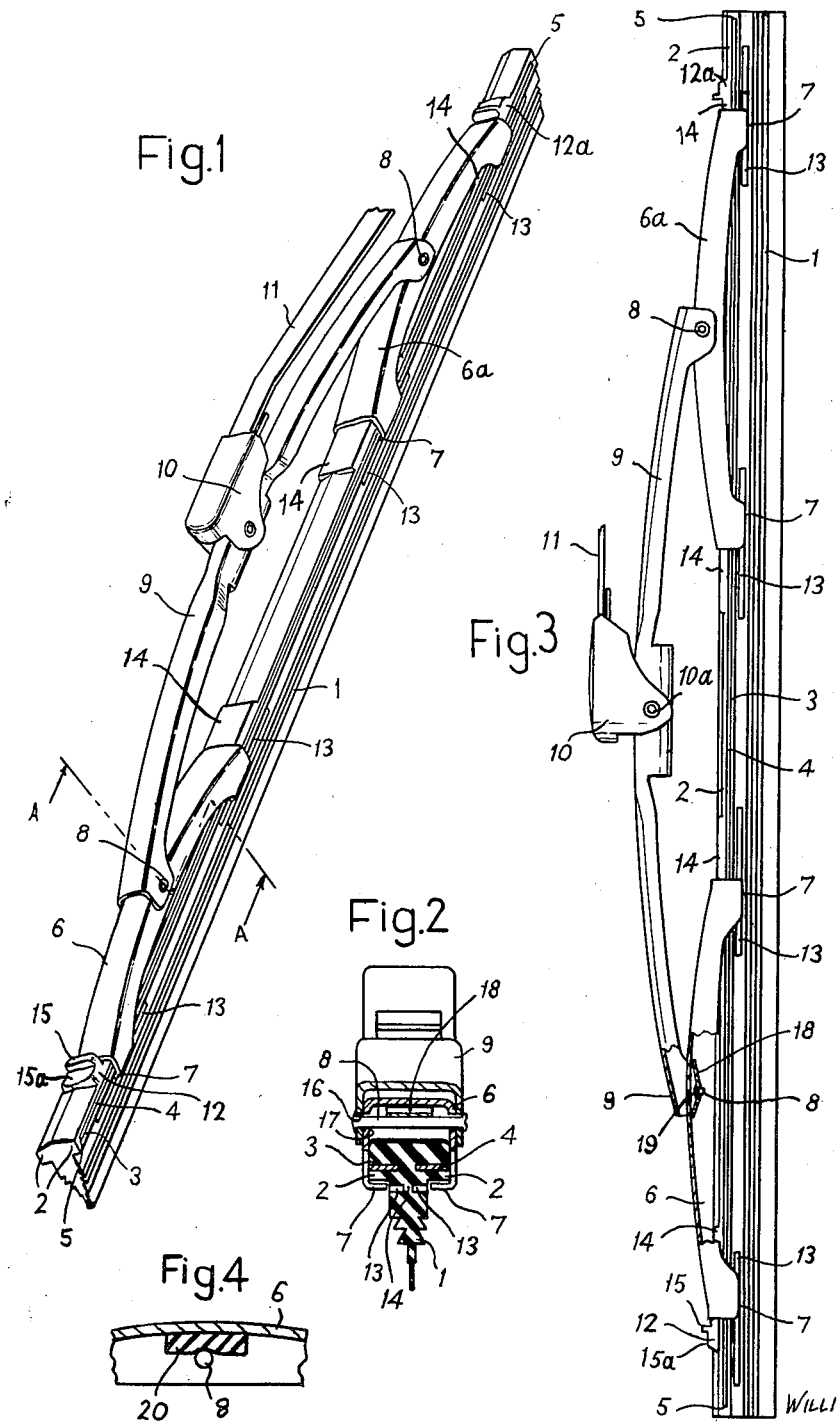

3,021,549
WINDSCREEN WIPERS
William Edward O'Shei, 11a Bath Road,
Middlesex, England
Filed May 14, 1958, Ser. No. 735,172
10 Claims. (Cl. 15—250.42)

The present invention relates to windscreen wipers, and more particularly to windscreen wipers which are suitable for wiping curved windscreens.

Windscreen wipers for wiping curved windscreens generally comprise a blade assembly comprising a squeegee element provided with one or more flexible metal strips extending therealong at or adjacent the rear thereof which permit(s) the squeegee element to flex in its own plane whilst restraining transverse flexing, the blade assembly being mounted in a pressure distributed holder comprising one or more yoke members and/or lever arms which distribute the wiper arm pressure along the length of the wiping edge of the squeegee element. As the squeegee element is free to flex in its own plane between the points where the yoke members or the like are attached to and directly apply pressure to the squeegee element (herein referred to as "pressure points"), the wiper arm pressure is not uniformly applied along the wiping edge of the squeegee element and in practice the portions of the wiping edge directly beneath the "pressure points" become folded over, as the wiper is reciprocated across the screen, more than the sections of the wiping edge intermediate these "pressure points."

An object of the present invention is to provide an improved construction of windscreen wiper for curved windscreens in which the pressure will be more evenly distributed along the length of the wiping edge whereby more uniform wiping will be achieved. Another object of the invention is to provide a squeegee element which is weakened at zones adjacent the "pressure points" whereby the portions of the wiping edge opposite these zones can rock or flex to a trailing position more readily than the portions of the wiping edge intermediate these zones. A further object of the invention is to provide a windscreen wiper for curved windscreens of which the squeegee element is provided with a non-uniform cross-section along its length in order that the wiper arm pressure will be applied substantially uniformly over the entire length of the wiping edge.

A still further object of the invention is to provide a windscreen wiper for curved windscreens which is simple and cheap to manufacture and assemble. Another object is to provide a windscreen wiper for curved windscreens in which noise produced between the parts of the pressure distributing holder and/or between the pressure distributing holder and the flexible strips as the blade is reciprocated across the screen will be substantially eliminated.

Further objects of the invention will be apparent or pointed out in the following description.

In order that the invention may be more clearly understood, reference will now be made to the accompanying drawing, in which:

FIGURE 1 is a perspective view of a windscreen wiper according to the invention, FIGURE 2 is a section along the line A—A in FIGURE 1, FIGURE 3 is a side view, partly in section to show the details of the hinge connection between the bridge piece and the yokes, FIGURE 4 is a detail showing a modified hinge connection.

Referring to the drawing, the windscreen wiper comprises a squeegee element 1 moulded of natural or synthetic rubber with a thin wiping edge portion, the cross-section increasing towards the rear of the squeegee element to provide backing-up support for the wiping edge. The rear of the squeegee element is formed with side flanges 2 respectively extending outwardly and along opposite sides of the squeegee element. In and along each flange is formed a groove 3. Each groove 3 is closed by an end wall portion 5 at each end thereof. Within each groove 3 is fitted a plain metal strip 4 of which the width corresponds approximately to the depth of a groove 3 so that the outer edge of a strip does not project at all, or substantially at all, from its associated groove. Two yoke members 6, 6a of channel shaped cross-section and conveniently formed of metal are attached towards opposite ends of the squeegee element by the fingers 7 at opposite ends of the yokes being folded around the undersides or front faces of the side flanges 2.

Intermediate points on the yokes 6, 6a are hingedly connected, for example by the rivets 8, to the bridge-piece 9 of channel cross-section which is connected by the rivet 10a to a connector 10 for connecting the wiper to a wiper arm 11. Longitudinal movement of the squeegee element within the pressure-distributing holder comprising the yokes and the bridge-piece is prevented by the projections 12, 12a moulded integrally with the back of the squeegee element so as to lie just beyond the opposite outer ends of the yokes 6, 6a respectively.

The projections 12 are preferably moulded with a stepped formation as shown. This facilitates assembling the squeegee element within the yokes by a longitudinal sliding movement since the upstanding part 15 of the projection can flex inwardly, substantially level with the step surface 15a of the projection to reduce the effective height of the projection and thus facilitate it being passed under the ends of the yokes. After assembly, an attempt to slide the squeegee element out of the yokes cannot reduce the effective height of the projection since the upstanding part 15 if it can fold over outwards, will rest on the step surface 15a and thus maintain the effective height.

The construction described enables the flexible strips 4 to be made separately and of uniform width throughout their length. They may be cut from metal ribbon of the appropriate width or may be cropped from metal sheet. They are retained assembled to the squeegee element by the ends of the yokes which retain the strips in the grooves 3, longitudinal movement of the strips in the grooves being prevented by the end walls 5. Special clips for holding the strips together, or the expense and difficulties of stamping them integrally, are avoided.

By entirely, or substantially entirely, enclosing the metal strips 4 within the grooves 3, and arranging the ends of the yokes 6, 6a to embrace and engage with the rubber flange portions 2 of the squeegee element, noise at this connection as the wiper is reciprocated across the screen is substantially eliminated. Further the compression of the rubber flange portions 2 as the squeegee element tends to assume a trailing position as the wiper moves across the screen assists in restoring the squeegee element to its vertical position and moving to a reverse trailing position as the direction of movement of the wiper reverses.

A slight clearance may be provided between the squeegee elements and the ends and fingers of the yokes to permit slight rocking movement of the squeegee element within the yokes, but preferably this clearance is kept small or eliminated in order to hold the squeegee element substantially normal to the screen as it is reciprocated thereacross, the trailing position of the wiping edge then being mainly achieved by flexing of the squeegee element itself. For the purpose of restraining rocking movement of the squeegee element within the yokes, the back of the squeegee element may be moulded with flat platforms 14 at the places where the ends of the yokes are attached thereto.

In the embodiment shown, grooves 13 are formed on opposite sides of the thickest part of the backing-up portion of the squeegee element directly in front of the flanges 2 at spaced zones therealong, each of which zones extend for a short distance to opposite sides of the "pressure points" where the ends of the yoke members are connected to the squeegee element. For example, the grooves 13 may be about 1" long extending about ½" to each side of a "pressure point." The thin webs 14 remain between pairs of grooves 13 on opposite sides of the squeegee element. With this construction, as the wiper is reciprocated across the screen, the portions of the squeegee element below the grooves 13 can hinge or rock to a trailing position about the webs 14 more easily than the portions of the squeegee element which do not lie opposite to a groove. In this way the parts of the wiping edge opposite the grooves 13 provide less support for the wiper arm pressure, and the portions of the wiping edges intermediate the "pressure points" are applied to the screen with greater pressure, whereby the wiper arm pressure is more uniformly applied along the length of the squeegee and an improved wiping action results.

As will be clear from FIGURE 2, the rivets 8 pass through apertures 16 in the ends of the channel side walls of the bridge piece 9 and aligned apertures 17 in the side walls of the yoke 6. In mass production manufacture, these rivets are inserted by a rivetting machine, which necessitates the holes 16, 17 in the bridge piece and yoke being larger than the rivet. In manufacture, it is preferable to form the holes in the side walls of the bridge piece and yoke members whilst these are in the form of flat blanks. The subsequent operation of folding over the side walls tends to elongate the holes in the up and down direction.

Consequently, although when the rivet 8 is inserted and rivetted over, it fits tightly in the apertures 16 in the bridge piece, there is appreciable clearance between the rivet and the holes 17 in the side walls of the yoke, which allows the yoke to move slightly within the bridge piece as the wiper reciprocates back and forth across the windscreen, thereby producing noise at the hinge connections.

Noise at this connection is eliminated by providing, between the rivet 8 and the inside surface of the back wall of the yoke 6, a resilient member which maintains the rivet resiliently pressed against those parts of the walls of the holes 17 in the yokes which are remote from the said back wall. As shown in the sectioned part at the left end of the bridge piece in FIGURE 3, this resilient member comprises a metal leaf spring 18 which is formed with a part-cylindrical recess 19 across its centre which locates on the rivet 8 and thus prevents the spring from falling out after it has been inserted.

Alternatively, as shown in FIGURE 4, the resilient member may comprise a block 20 of resilient material, such as natural or synthetic rubber, which is inserted between the rivet 8 and the inside surface of the back wall of the yoke.

Whilst particular embodiments have been described, it will be understood that various modifications may be made without departing from the scope of the invention. Thus the pressure distributing holder need not comprise two yoke members and a bridge piece. It may comprise a single yoke or a bridge piece or it may comprise more than two yoke members, for example four yoke members, which may be interconnected in pairs by secondary yokes which are in turn interconnected by a bridge piece. In this case noise eliminating resilient members may be incorporated at the connections between the yoke members and the secondary yokes as well as between the ends of the bridge piece and the secondary yokes. Other constructions of holders comprising, for example, an odd number of yokes, or yokes with interconnected lever arms, may also be constructed to incorporate the features of this invention. Resilient means may also be provided at the rivet 10a.

Two or more flexible strips may be fitted in each groove. These may be superimposed or a number of strips, each having a length which is only a part of the length of the squeegee element, may be arranged end-to-end or partially overlapping in a groove. Between end-to-end strips there may be formed a partition wall in the groove, similar to the end walls 5. To prevent the short strips from falling out of the groove, each strip should extend for such a length as to be embraced by at least two yoke ends.

In another modification, the enlargements or projections 12 can be formed on the sides of the flanges 2 instead of on the back of the squeegee element.

I claim:

1. A windscreen wiper comprising a squeegee element having flanges extending outwardly along each side of and adjacent the rear of the squeegee element, grooves formed respectively in the side faces of and extending along said flanges for substantially the whole length of but terminating short of the ends of the flanges so that, the ends of said grooves are closed, at least one flexible flat strip arranged in each of said grooves with its width extending transversely of the squeegee element, the transverse depth of the grooves being such that the faces of the strips are substantially entirely covered by the adjacent parts of the flanges which define the walls of the grooves, endwise movement of the strips in the grooves being prevented by the closed ends of the grooves and a pressure distributing holder extending along the back of the squeegee element and comprising at least one yoke member of which the ends embrace the back of the squeegee element and the flanges and engage in front of the flanges, thereby securing the squeegee element to the pressure-distributing holder and retaining the flexible strips in the grooves against sideways displacement.

2. A windscreen wiper as claimed in claim 1, wherein the squeegee element is moulded with enlargements which are adapted to engage with the ends of said at least one yoke member to locate the squeegee element longitudinally relative to the pressure distributing holder.

3. A windscreen wiper as claimed in claim 2, wherein two projections are provided on the back of the squeegee element, at least one of said projections being of stepped form with the higher step at the inner end of the projection and arranged to flex down inwardly beyond the projection when sliding the squeegee element longitudinally into the pressure distributing holder to assemble them together.

4. A squeegee element for a windscreen wiper which is moulded with a continuous wiping edge and outwardly extending flanges along each side of and adjacent the rear of the squeegee element, grooves formed respectively in the side faces of and extending along said flanges for substantially the whole length of but terminating short of the ends of the flanges so that, the ends of said grooves are closed, and two projections on the back of the squeegee element disposed respectively adjacent opposite ends of the squeegee element, at least one of said projections being of stepped form with the higher step at the inner end of the projection and arranged to flex down inwardly beyond the projection when sliding the squeegee element longitudinally into the pressure distributing holder to assemble them together.

5. Windscreen wiper as claimed in claim 1, wherein the pressure-distributing holder comprises members of channel cross-section which are pivotally connected together by means of a rivet passing through apertures in the side walls of two members nesting one within the other, resilient means being provided to press on to the rivet to hold it firmly against the walls of the apertures in the inner member through which it passes.

6. A windscreen wiper as claimed in claim 5, wherein the resilient means comprises a leaf spring having a transverse recess formed across its central region, said recess engaging with the rivet and locating the spring in position.

7. Windscreen wiper comprising a blade assembly comprising a squeegee element having a continuous wiping edge, the cross-sectional area of the squeegee element increasing towards the back thereof to form a backing-up portion to provide backing-up support for the wiping edge and the squeegee element having a rear zone fitted with at least one flexible strip extending therealong so as to permit the squeegee element to flex in its own plane whilst restraining transverse flexing, the blade assembly being mounted in a pressure-distributing holder comprising pivotally interconnected members having their ends attached to the blade assembly at spaced pressure points therealong to apply the wiper arm pressure at said spaced pressure points along said rear zone of the squeegee element, wherein the squeegee element is formed with a plurality of short grooves disposed in longitudinally spaced relation in both side faces of the backing-up portion of the squeegee element, there being a groove in each side face opposite each pressure point which extends for a limited distance along the squeegee element to opposite sides of the pressure point which is less than one half the distance to the next adjacent pressure point, said grooves being of such depth as to leave between pairs of opposing grooves thin webs forming hinge portions in the backing-up portion of the squeegee element about which the portions of the wiping edge of the squeegee element opposite the pressure points can flex to a trailing position as the wiper reciprocates across the screen.

8. A windscreen wiper comprising a blade assembly comprising a squeegee element moulded with a continuous wiping edge and a backing-up portion spaced rearwardly thereof and with outwardly extending side flanges along each side of the squeegee element adjacent the rear thereof, and at least one flexible strip extending along and adjacent the rear of the squeegee element to permit the squeegee element to flex in its own plane while restraining transverse flexing, the blade assembly being mounted in a pressure-distributing holder comprising pivotally interconnected members having their ends attached to the blade assembly at spaced pressure points therealong, wherein said squeegee element is formed with a plurality of short grooves disposed in longitudinally spaced relation in both side faces of the backing-up portion of the element which lie in front of the flanges, there being a short groove in each said side face opposite each pressure point which extends for a limited distance along the squeegee element to opposite sides of the pressure point which is less than one half the distance to the next adjacent pressure point, said grooves forming hinge portions in the backing-up portion of the squeegee element about which the portions of the wiping edge of the squeegee element opposite the pressure points can flex to a trailing position as the wiper reciprocates across the screen.

9. A windscreen wiper comprising a squeegee element moulded with a continuous wiping edge and a backing-up portion spaced rearwardly thereof and with outwardly extending side flanges along each side of the squeegee element adjacent the rear thereof, grooves formed respectively in the side faces of and extending along said flanges for substantially the whole length of but terminating short of the ends of the flanges so that the ends of said grooves are closed, at least one flexible flat strip arranged in each of said grooves with its width extending transversely of the squeegee element, the transverse depth of the grooves being such that the faces of the strips are substantially entirely covered by the adjacent parts of the flanges which define the walls of the grooves, endwise movement of the strips in the grooves being prevented by the closed ends of the grooves, and a pressure-distributing holder comprising pivotally interconnected members having their ends attached to the squeegee element at spaced pressure points therealong by the ends of the pressure distributing members embracing the back of the squeegee element and around the flanges to engage the front faces of the flanges, thereby also preventing the flexible strips from moving sideways out of their grooves, wherein said squeegee element is formed with a plurality of short grooves disposed in longitudinally spaced relation in both side faces of the backing-up portion of the element which lie in front of the flanges, there being a short groove in each said side face opposite each pressure point which extends for a limited distance along the squeegee element to opposite sides of the pressure point which is less than one half the distance to the next adjacent pressure point, said grooves forming hinge portions in the backing-up portion of the squeegee element about which the portions of the wiping edge of the squeegee element opposite the pressure points can flex to a trailing position as the wiper reciprocates across the screen.

10. A windscreen wiper as claimed in claim 9, wherein the squeegee element is moulded with two projections on its back which are adapted to engage ends of the members of the pressure-distributing holder to locate the squeegee element against longitudinal movement therein, at least one of said projections being of stepped form with the higher step at the inner end of the projection and arranged to flex down inwardly beyond the projection when sliding the squeegee element longitudinally into the pressure-distributing holder to assemble them together.

References Cited in the file of this patent

UNITED STATES PATENTS

| | | |
|---|---|---|
| 2,667,656 | Oishei | Feb. 2, 1954 |
| 2,741,791 | Scinta | Apr. 17, 1956 |
| 2,767,419 | Horton | Oct. 23, 1956 |
| 2,807,821 | Scinta | Oct. 1, 1957 |
| 2,907,065 | MacPherson | Oct. 6, 1959 |
| 2,923,021 | Hale | Feb. 2, 1960 |

FOREIGN PATENTS

| | | |
|---|---|---|
| 504,083 | Great Britain | Apr. 19, 1939 |
| 753,108 | Great Britain | July 18, 1956 |
| 755,120 | Great Britain | Aug. 15, 1956 |
| 936,553 | Germany | Dec. 15, 1955 |